Feb. 12, 1963  S. G. SHUTTLEWORTH  3,076,987
PROCESS FOR THE STIFFENING OF PARTS OF FOOTWEAR
Filed Jan. 18, 1960  2 Sheets-Sheet 1
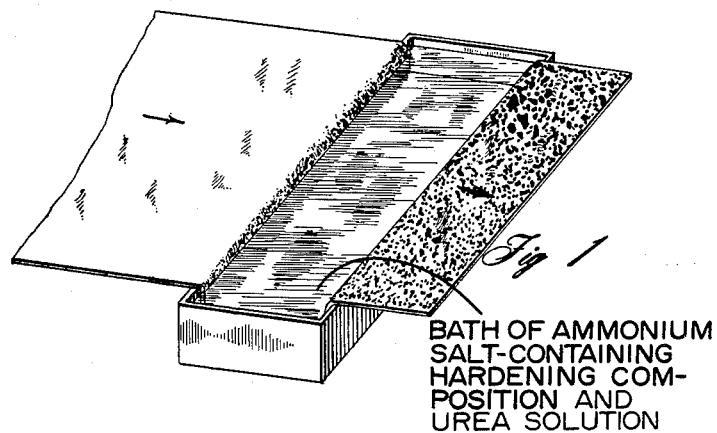
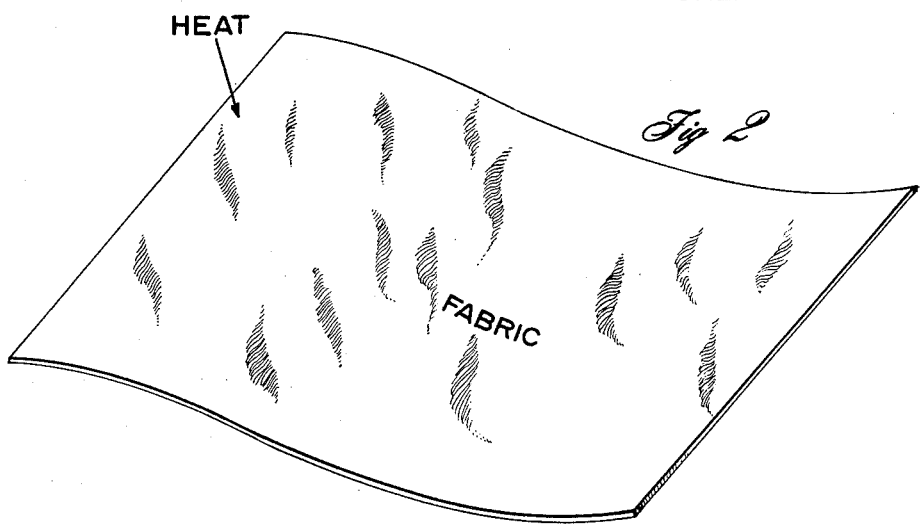
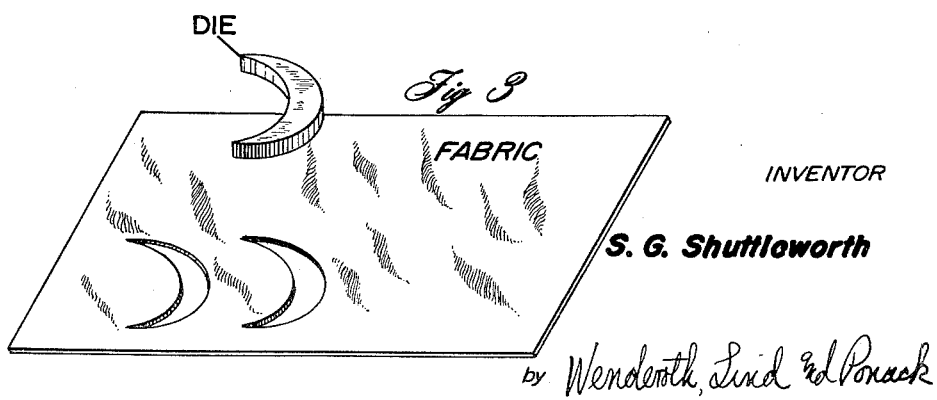
INVENTOR
S. G. Shuttleworth
by Wenderoth, Lind & Ponack
Attorneys

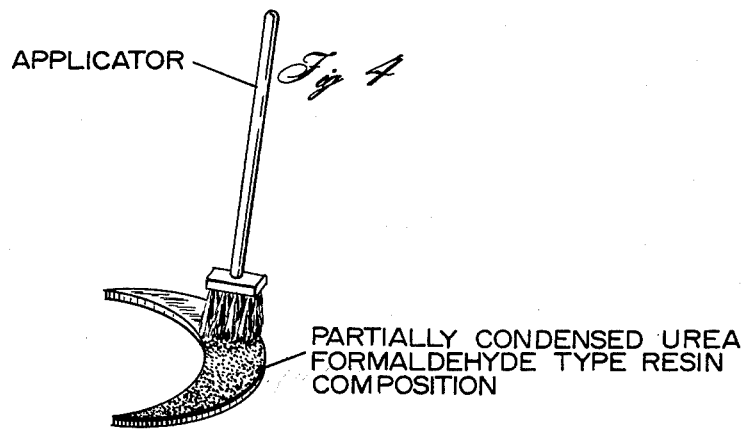
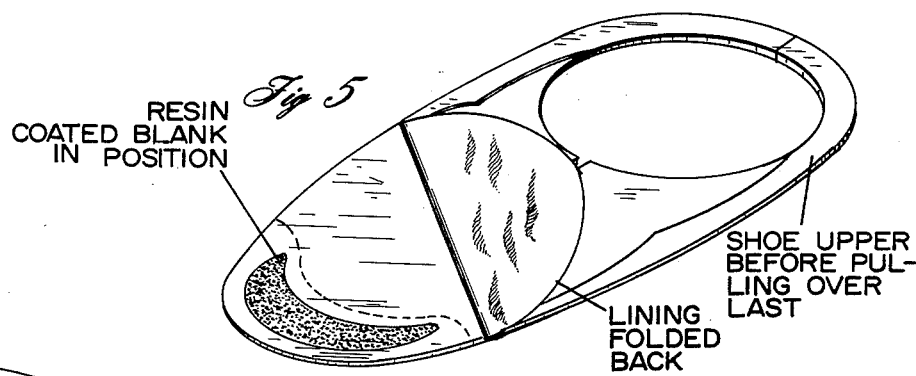
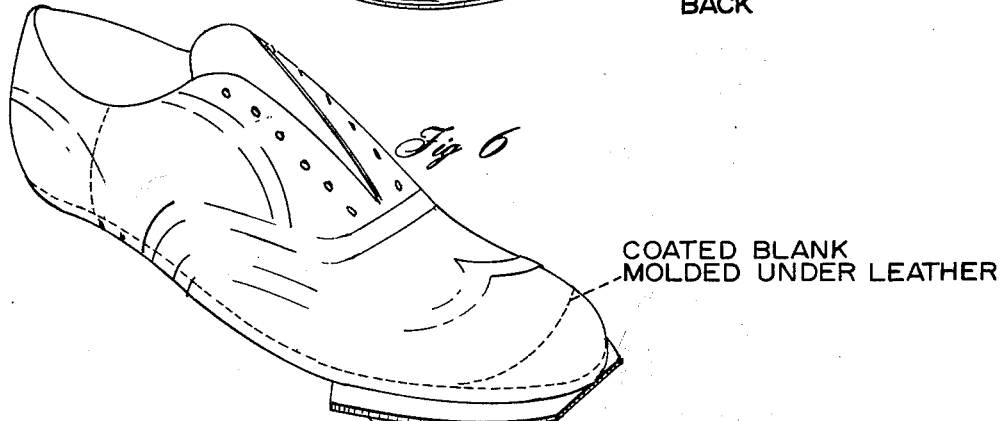

United States Patent Office 3,076,987
Patented Feb. 12, 1963

3,076,987
PROCESS FOR THE STIFFENING OF PARTS OF FOOTWEAR
Stanley Gordon Shuttleworth, Grahamstown, Republic of South Africa, assignor to Leather Industries Research Institute, Grahamstown, Republic of South Africa
Filed Jan. 18, 1960, Ser. No. 7,967
Claims priority, application Republic of South Africa Jan. 19, 1959
4 Claims. (Cl. 12—146)

This invention relates to a process for stiffening parts of footwear. The invention is, more particularly, an improvement or development of a known process for stiffening parts of footwear and comprises the insertion, into an appropriate position in the footwear, of a fabric blank impregnated with a chemical accelerator, catalyst, or hardener and moulding the footwear to the last while shortly before the moulding of the footwear to the last, the impregnated fabric blank is brought into contact with a synthetic resin in the form of a liquid or paste capable of being solidified by said accelerator, hardener or catalyst.

In said known process the fabric blank may be coacted with the said synthetic resin before or after its insertion into the footwear. The synthetic resin may consist of partially condensed urea formaldehyde and the hardener of ammonium chloride or any other suitable ammonium salt or like chemical which will not weaken the fabric, and the blank may be pre-stiffened prior to insertion in the footwear.

Fabric in this specification must be understood to include textile and fibrous materials, such as for example cardboard.

The desired firmness of the fabric stiffening blank can be achieved without heat and without a special softening step if a fabric medium, which has previously been impregnated with a chemical hardener and dried, is applied to the part to be stiffened, and a synthetic resin, capable of being activated by this chemical hardener is applied to the medium just prior to moulding on the last. No heat is then required to set the resin. This process also enables the resin to be forced into the upper and lining, creating a laminated structure.

Very thin and porous fabrics can be used to carry an adequate quantity of hardener, thereby reducing both the bulkiness of toe or heel as well as providing greater ease of moulding in the shoe factory. Furthermore, the synthetic resin can be applied in a uniformly liquid and active form, capable of being forced well into the fibers of upper and lining, thus securing very good adhesion, firmness and resilience, without heating. Fabric blanks according to such process, permit of storage of the treated fabric in which case the chemical hardener should be of a type which does not weaken the fabric and is preferably one giving a pH value to the fabric not lower than 3.0. Hardeners such as ammonium chloride, ammonium phosphate or ammonium sulphate, has been found to be suitable when used with a urea formaldehyde type of synthetic resin.

Stiffening of the fabric can be accomplished by means of a variety of stiffening agents such as a small proportion of synthetic resin, or a larger proportion of starch, dextrine, glue, casein or other stiffening agent.

Such stiffening agent may be added to the fabric before, during or subsequent to the impregnation of the fabric with the chemical hardener. Such pre-stiffening is primarily to facilitate handling of the blank and does not replace the use of synthetic resin in the footwear factory itself.

The pre-impregnation of the fabric medium may be by spraying or dipping and may be assisted by the addition of a small percentage of a wetting agent such as synthetic detergent, followed by the drying and storage.

The chemical hardener used in the known process is of a type and is left in sufficient quantity on the dried fabric medium to cause hardening of a subsequent coating of an appropriate synthetic resin. When required, suitably shaped blanks are cut from this treated fabric and are coated at the most suitable place and time in the footwear factory with the synthetic resin in the form of a partially condensed solution or paste, and placed in the footwear prior to moulding of the upper on the last.

The said known process generally involves the production and supply of fabrics containing an ammonium salt hardener which receives in the footwear factory a coating of synthetic resin prior to placing such fabric in the toe or heel of the footwear whereafter moulding to shape is effected.

During the course of large-scale utilization or application of this process in footwear factories, it has become evident that some factories require a longer period for moulding the toe or heel of the footwear to final form and, further, that the action of the ammonium salt or like hardener alone is often too rapid.

According to this invention the process for stiffening parts of footwear comprising the insertion, into an appropriate position in the footwear, of a fabric blank which has been previously impregnated with a chemical hardener and thereafter dried and moulding the footwear to the last shortly after the impregnated blank was brought into contact with a synthetic resin in the form of a liquid or paste capable of being hardened by said hardener, characterised in that the time required for hardening of the synthetic resin is controlled by impregnating the said fabric blank with an appropriate quantity of urea together with said hardener prior to drying the fabric blank.

The fabric blank may be pre-stiffened by also impregnating it before drying with amounts of starch, dextrine, glue, casein or other stiffening agent or said synthetic resin appropriate to counteract the tendency of the urea to make the fabric softer. The quantity of pre-stiffening treatment included with the ammonium salt hardener must be increased to give easy handling as the urea tends to make the fabric softer, due probably to its affinity for atmospheric moisture.

It has further been found desirable to incorporate a small percentage of dyestuff into the fabric, each colour indicating a particular mixture of impregnants of such fabric to permit ready choosing at the factory of fabric blanks giving different hardening rates for different operations and for different climatic conditions.

The process is schematically illustrated in the accompanying drawings, in which—

FIG. 1 is a schematic representation of the step of passing a fabric through a bath of ammonium salt containing hardening composition and urea solution to impregnate the fabric;

FIG. 2 is a schematic representation of the step of heating the fabric to dry it;

FIG. 3 is a diagrammatic representation of cutting a member for insertion into a shoe from the dried fabric;

FIG. 4 is a schematic representation of the step of applying a partially condensed urea formaldehyde type resin composition to the blank;

FIG. 5 is a schematic representation of the step of inserting the coated blank in position in the upper of the shoe; and FIG. 6 is a schematic representation of molding the upper with the coated blank therein in a shoe.

The following are examples illustrating the invention:

*Example 1*

The fabric is passed through a solution containing one-half percent of an organic wetting agent plus 0.1 percent of a soluble blue dyestuff plus 10 percent of a 60 percent urea formaldehyde resin solution plus 10 percent of ammonium chloride plus 5 percent of urea. The fabric passed through said solution is thereafter dried. On coating of the fabric with urea formaldehyde resin a moulding time will be presented of about 1½ hours at 20° C. before onset of setting.

*Example 2*

The fabric is passed through a solution containing one-half percent of an organic wetting agent plus 0.1 percent of a soluble green dyestuff plus 15 percent of a 60 percent urea formaldehyde resin solution plus 5 percent of ammonium chloride plus 10 percent of urea. The fabric after passing through the solution is dried. On coating of the fabric with urea formaldehyde resin a moulding time of about 3 hours at 20° C. will be presented before onset of setting.

I claim:

1. A process for stiffening parts of footwear comprising the steps of preparing a dry fabric stiffener by passing a fabric through a bath containing at least 5% urea and containing an ammonium salt selected from the group consisting of ammonium chloride, ammonium sulphate and ammonium phosphate, coating the stiffener with a partially condensed urea formaldehyde resin composition in at least semi-liquid form at a time just prior to moulding the footwear to the last, inserting the coated stiffener into the part of the footwear to be stiffened and moulding the footwear to the shape of the last.

2. A process for stiffening parts of footwear as claimed in claim 1 in which the dry fabric stiffener was partially stiffened prior to drying by impregnating it with an appropriate amount of starch, dextrine, glue, casein or the said partially condensed urea formaldehyde resin composition.

3. A process for stiffening parts of footwear as claimed in claim 1 in which the dry fabric stiffener is provided in different colors each color corresponding to a specified amount of urea in said fabric stiffener.

4. In a process for stiffening parts of footwear in which a dry fabric stiffener impregnated with a hardening composition is coated with a partially condensed urea formaldehyde resin composition in at least semi-liquid form at a time just prior to moulding the footwear to the last and the coated stiffener is inserted into the part of the footwear to be stiffened, and then the footwear is moulded to the shape of the last, that improvement comprising preparing the fabric stiffener by passing a fabric through a bath containing at least 5% urea and containing an ammonium salt selected from the group consisting of ammonium chloride, ammonium sulphate and ammonium phosphate as the hardening composition.

References Cited in the file of this patent
UNITED STATES PATENTS

| | | |
|---|---|---|
| 2,123,152 | Rivat | July 5, 1938 |
| 2,919,453 | Shuttleworth | Jan. 5, 1960 |
| 2,935,753 | Heaton | May 10, 1960 |
| 2,958,880 | Morse | Nov. 8, 1960 |